United States Patent [19]

Kronseder

[11] Patent Number: 5,743,377
[45] Date of Patent: Apr. 28, 1998

[54] TRANSPORT STAR FOR CONTAINERS

[76] Inventor: E. H. Hermann Kronseder, Regensburgerstrabe 42, 93086 Worth/Donau, Germany

[21] Appl. No.: 639,115

[22] Filed: Apr. 24, 1996

[30] Foreign Application Priority Data

| May 13, 1995 | [DE] | Germany | 295 07 933.9 |
| Nov. 15, 1995 | [DE] | Germany | 195 42 518.9 |

[51] Int. Cl.[6] ................................................ B65G 47/86
[52] U.S. Cl. ............................... 198/803.9; 198/470.1
[58] Field of Search ........................... 198/803.9, 470.1

[56] References Cited

U.S. PATENT DOCUMENTS

| 2,938,620 | 5/1960 | Waters | 198/803.9 |
| 3,124,232 | 3/1964 | Humen | 198/470.1 |
| 3,155,228 | 11/1964 | Norwood . | |
| 3,570,647 | 3/1971 | Meikle | 198/470.1 |
| 3,710,928 | 1/1973 | van Zijp | 198/803.9 |
| 3,754,637 | 8/1973 | Carter et al. | 198/470.1 |
| 4,172,514 | 10/1979 | Shantz et al. | 198/470.1 |
| 4,512,456 | 4/1985 | Peyton | 198/470.1 |
| 4,651,879 | 3/1987 | Harris et al. | 198/803.7 |
| 4,681,213 | 7/1987 | Winiasz | 198/803.9 |
| 4,938,337 | 7/1990 | Jowitt et al. | 198/470.1 |
| 4,984,680 | 1/1991 | Hamano | 198/803.9 |
| 5,607,045 | 3/1997 | Kronseder | 198/803.9 |

FOREIGN PATENT DOCUMENTS

| 0 366 225 B1 | 12/1993 | European Pat. Off. . | |
| 1 482 616 | 11/1972 | Germany . | |
| 3133341 | 3/1983 | Germany | 198/470.1 |
| 6513849 | of 0000 | Netherlands . | |
| 1093660 | 5/1984 | U.S.S.R. | 198/803.9 |
| 1040632 | 9/1966 | United Kingdom | 198/470.1 |

*Primary Examiner*—Karen B. Merritt
*Assistant Examiner*—Douglas Hess
*Attorney, Agent, or Firm*—Tilton, Fallon, Lungmus & Chestnut

[57] ABSTRACT

A transport star in which movable expanders with multiple self-locking positions, which can be selected with a control apparatus, engage the radially inward-directed counter-arms of several gripping pliers with pivoting clamps positioned along the perimeter of a rotating basic structure. This provides a design for a device which is relatively simple and reliable, and can be adjusted quickly and easily to accommodate different-sized containers.

24 Claims, 5 Drawing Sheets

TRANSPORT STAR FOR CONTAINERS

BACKGROUND

1. Field of the Invention

This invention relates generally to devices for transporting containers, and specifically to a transport star unit having several gripping pliers to facilitate movement of containers.

2. Description of the Prior Art

In the known version of this type of transport star, the expander consists of a radially mobile wedge, which is pressed between the opposing arms of the tongs with a self-contained stationary radial cam (DE-OS 1 482 616). Because of the transmission ratio between the expander and the tongs' opposing arms, a relatively strong gripping force can be achieved with a relatively small driving force, thus ensuring that the tongs are able to grip the containers properly. In order to process bottles with a different diameter, the radial cam, which presses the expander outwards throughout the entire gripping area, has to be replaced or adjusted. The amount of time and effort required to make such adjustments is considerable.

The same holds true for another transport star for containers, in which the gripping pliers consist of two one-armed levers whose bearing shafts interlock through toothed wheels (EP-OS 366 225). A roll lever attached to one of the drive shafts scans a flared self-contained stationary radial cam. The radial cam is height-adjustable, so that the gripping pliers' cam and flare angles can be adjusted to suit various container diameters. Although this device allows for faster container size adjustments, this comes at the cost of considerably increased design complexity.

The task of this invention is to provide a device which is based on the generic transport star, retains a relatively simple and reliable design, and can be adjusted quickly and easily to accommodate different-sized containers.

According to the invention, this task is solved by applying the unique attributes listed under patent claim 1.

In a transport star based on this invention, several predetermined cam positions are integrated into the gripping pliers themselves; because the expanders are free-standing, these cam positions can be maintained without the need for radial cam support. Therefore, a brief selection of the desired locking position is sufficient for gripping the container, while the same brief selection procedure suffices for its release. Adding this feature requires a minimum in additional design effort.

Other advantageous features, which help simplify construction of the device, as well as ensuring safe operation and optimal adjustment to various container diameters, are described.

Four possible executions of the invention are described below. These executions are illustrated in the corresponding figures:

DETAILED DESCRIPTION OF THE PREFERRED EMBODIMENTS

Figure 1:
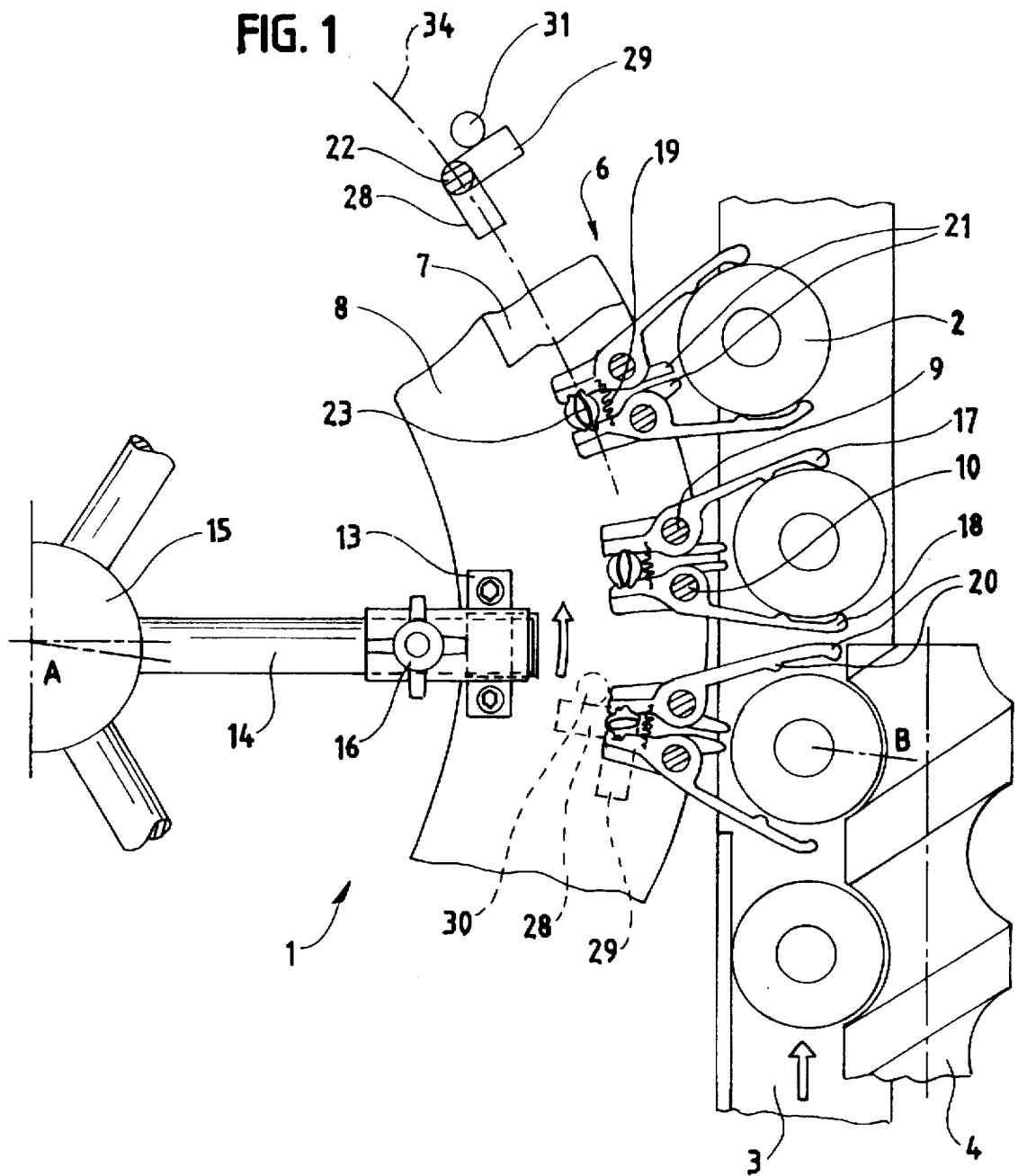
FIG. 1 is a partial top view of the first embodiment of the transport star of the present invention.
Figure 2:
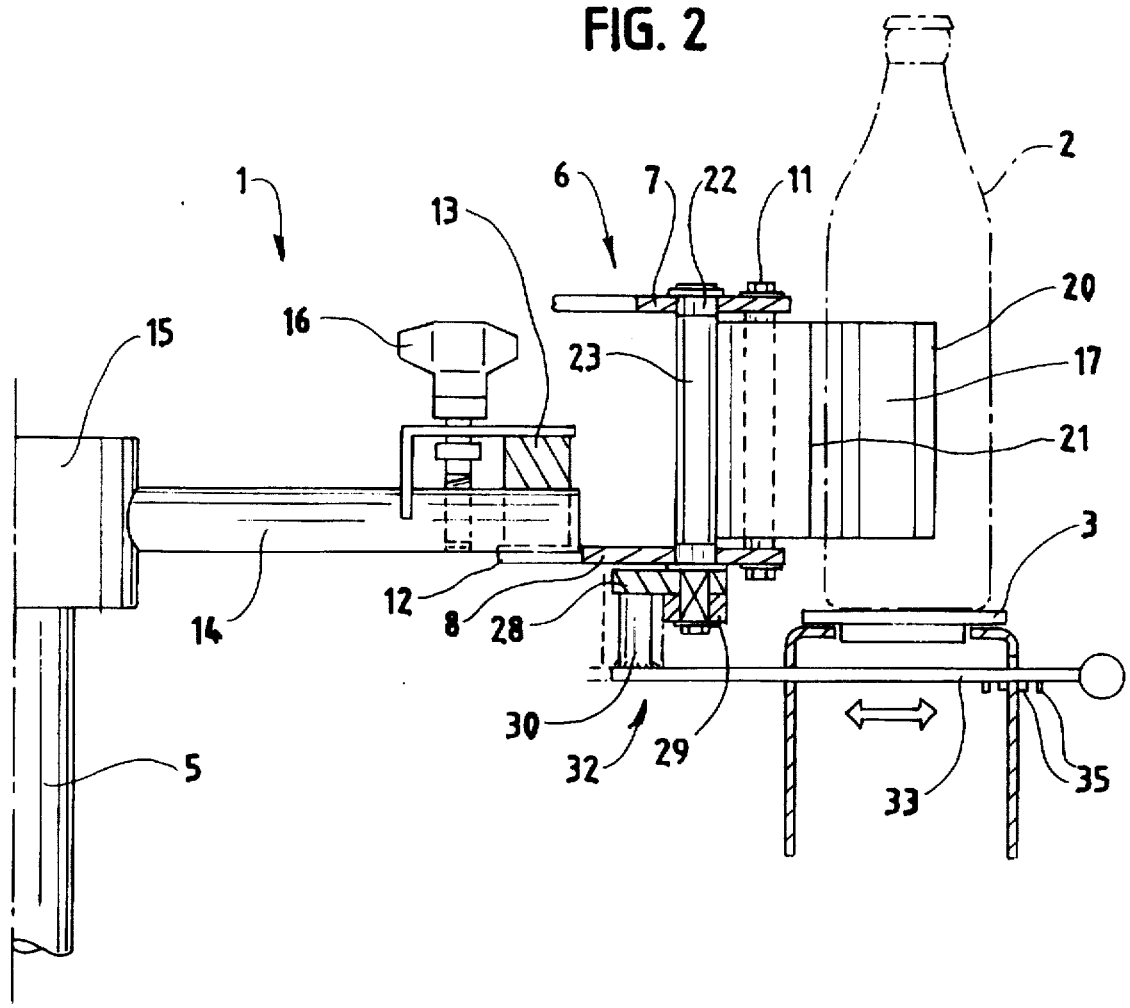
FIG. 2 is a side view of the transport star of the present invention, taken along the lines A-B in FIG. 1.
Figure 3:
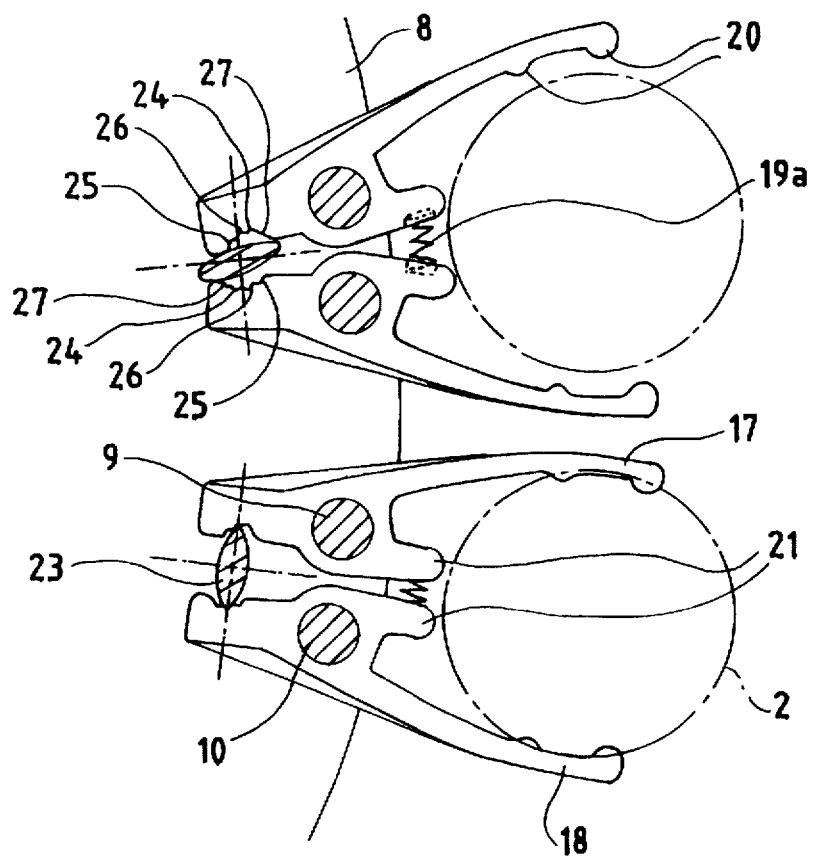
FIG. 3 is an enlarged top view of two gripping pliers in the star-shaped transport device shown in FIGS. 1 and 2.

The transport star 1 shown in FIGS. 1 through 3 is designed to transport vertically positioned containers in the shape of bottles (2). The system is integrated into the entry area of a bottle processing machine, such as an inspection machine, of which only the conveyor belt (3), the spiral separator (4) and a drive shaft (5) for the transport star are shown.

The transport star's (1) basic structure (6) consists primarily of two parallel circular rings (7, 8). The two rings (7, 8) have the same external diameter. Their internal diameters are different. The internal diameter of the upper ring (7) is smaller than that of the lower ring (8). The two rings are positioned concentrically and are rigidly connected to one another with several pairs of round bolts (9, 10) that are distributed around the perimeter. Each of these bolts (9, 10) is positioned between the two rings (7, 8), and is connected by two screws (1).

There are several square openings (12) in the inner surface of the lower ring (8); these openings are distributed evenly along the perimeter of the ring and are covered by bridge-shaped retaining blocks (13). The retaining blocks (13), which are attached to the ring (8), rest loosely on the ends of the radial arms (14) of a wheel hub (15) which, in turn, is mounted onto the drive shaft (5). Several manually controllable clamping devices (16), which act on the retaining blocks (13), are used to clamp the basic structure (6) to the arms (14), so that the basic structure (6) remains detachable; the basic structure's center axis is thus concentric to the drive shaft (5).

A viscoplastic one-piece molded clamp (17, 18) runs on swivel bearings on each bolt (9, 10). The two clamps (17, 18) for each bolt pair (9, 10) are designed as mirror images of one another, or as double levers. The lever arms, which point radially outwards, act as gripper arms. Together, the two lever arms form a set of gripping pliers, which encloses the bottle (2) positioned between the arms by more than 180 degrees. The two lever arms that point radially inwards form counter-arms to which a tension spring (19) is attached. This spring pulls the counter-arms together so that the gripping pliers, which consist of the two corresponding clamps (17, 18), open. The same effect can be achieved with a pressure spring (19a) positioned between the gripper arms, as shown in FIG. 3. The opposing ends of the gripper arms are equipped with two spaced vertical pads (20) which center bottles (2) of different diameters on the desired positioning circle. In addition, the clamps (17, 18) are equipped with cams (21) that point radially outwards; these cams act as tappet stops for the incoming bottles (2).

Parallel to each bolt pair (9, 10) and halfway between the counter-arms of the clamp pairs (17, 18), a cam shaft (22) pivots inside the rings (7, 8). This cam shaft contains an oblong cam (23) positioned at the same level as the counter-arms; the cam has an oval profile and consists partly of two parallel flattened portions of the drive shaft (22). The cam (23) defines the open position of the corresponding clamps (17, 18) if its parallel lateral surfaces are positioned approximately in a radial relationship to the transport star's (1) center axis; in this instance, tension spring (19) action brings the counter-arms as close together as possible which, in turn, results in the gripper arms being as far apart as possible. When the gripper arms are in the open position, any bottle (2) that falls within the range of allowable diameters can enter the "star pocket" formed by the clamps (17, 18) without any obstruction. The cam (23) defines three different closing positions of the corresponding clamps (17, 18) if its parallel lateral surfaces are approximately tangential to the transport star's (1) center axis; in this instance, the two counter-arms act against the force of the tension spring (19) and are spread as far apart as possible. The gripper arms come together accordingly, with the resulting space between them being smaller than the diameter of the bottles (2) to be transported. As a result, the clamps bend elastically whenever a bottle (2) is gripped. Together with the action of the pads (20), the resulting strong gripping force ensures that the bottles are tightly secured between the clamps (17, 18), thus eliminating the need for any guiding equipment, such as rails or guide segments, in the transport area.

As FIG. 3 shows, there are grooves (24, 25, 26) of varying depth cut into each of the two sides of the counter-arms to the clamps (17, 18) that form the gripping pliers. The grooves on each of the counter-arms are mirror-inverted to those on the opposing arm, and their profiles match the shape of the cam (23). When it is seated in the two deep grooves (24), the cam (23) defines the first locking position, which corresponds to a "large" bottle diameter. When it is seated in the two flat grooves (25), the cam (23) defines the second locking position, which corresponds to a "small" bottle diameter. When it is seated in the two medium grooves (26), as shown at the bottom of FIG. 3, the cam (23) defines the third locking position, which corresponds to a "medium" bottle diameter. When it is in any of the locked positions, the tappet (23) is more tangential than radial to the transport star's (2) axis of rotation. The grooves (24, 25, 26) are shaped in such a way that the cam (23) can lock itself into each of the locking positions. When it is in one of these positions, the force of the tension spring (19) and, if there is a bottle clamped into the device, the tension force created when the clamps (17, 18) bend elastically, impinges on the cam. On the other hand, the rounded grooves (24, 25, 26) are designed in such a way that, in spite of the force resulting from elastic distortion of the clamps (17, 18), the cam (23) can be snapped into or out of the grooves (24, 25, 26) at any time, provided there is sufficient torque available to do so. This effect is supported by rounding off the areas between the adjacent grooves (24, 25, 26).

As shown at the top of FIG. 3, rather than being positioned in an exact radial relationship to the transport star's (1) axis of rotation, the cam (23) is at a slight angle in the open tong position. As shown at the bottom of FIG. 3, when the cam (23) is in the third locking position for medium bottle diameters, it is exactly tangential to the transport star's (1) axis of rotation. If the cam (23) is rotated counter-clockwise from the open tong position to the third locking position, it completes an angle of less than 90 degrees. If the cam (23) is moved into the second locking position, i.e., into groove 25, it completes a pivoting angle of exactly 90 degrees. The pivoting angle for the first locking position, i.e., for groove 24, is somewhat smaller than it is for the third locking position, or groove 26. Therefore, the open tong position and the three locking positions are all within a 90 degree pivoting angle.

If the cam (23) moves counter-clockwise from the open tong position toward a locking position, it first passes through rounded transitional areas (27). As this occurs, the counter-arms are pressed progressively farther apart until the cam snaps into the deep grooves (24). When the rotation is continued, the cam (23) first snaps into the medium grooves (26) and, after having completed a 90 degree rotation, it snaps into the flat grooves (25). As this occurs, the clamps' (17, 18) counter-arms are spread progressively farther apart, while the gripper arms move closer together. When the cam is rotated back to the open position, the same set of movements occurs clockwise in reverse.

The lower end of each drive shaft (22) projects slightly from the lower ring (8). Two control levers (28, 29) are attached at right angles to each of these projecting shaft ends. These operate in conjunction with two bolt-like stops (30, 31), which are rigidly attached to the bottom of the transport star; together, these components form a control apparatus for the clamps (17, 18).

The first stop (30) is positioned within the circular path (34) of the drive shafts (22), and operates in conjunction with the upper control lever (28). When the transport star (1) turns in the direction of the arrow, it pivots all passing drive shafts (22) out of the open position into a selected locking position; this occurs in the transitional area between the spiral separator (4) and the transport star (1). In this location, the bottles (2) are still wedged into the pocket formed by the thread of the spiral separator (4), while at the same being fully inserted into a pocket formed by the transport star's (1) opened clamps (17, 18). When the clamps (17, 18) close, the bottles (2) are clamped into the transport star (1), centered, and are then transported along a curved path away from the conveyor belt (3) and in the direction of another installation, such as a rotary table (not depicted).

As FIG. 2 shows, the first stop (30) is attached to the upper surface of a horizontal slide (33) in the shape of a flat bar; this horizontal slide, located underneath the end of the spiral separator (4), is longitudinally displaceable along bearings in the conveyor belt frame (3). This longitudinal movement is approximately radial to the transport star's (1) axis of rotation. Through notches (35) located on the bottom of the slide (33), the slide can be locked into three preset positions.

In the middle position shown in the figure, the stop (30) pivots all passing drive shafts (22) in a counter-clockwise direction by approximately 75 degrees. This causes the cams (23) to pivot out of the open position and into the third locking position, where they snap into the middle grooves (26). In the inner limit position, which is indicated by dotted lines, the stop (30) pivots all passing drive shafts (22) in a counter-clockwise direction by approximately 60 degrees. This causes the cams (23) to pivot out of the open position and into the first locking position, where they snap into the deep grooves (24). In the outer limit position, which is also indicated by dotted lines, the stop (30) pivots all passing drive shafts (22) in a counter-clockwise direction by approximately 90 degrees. This causes the cams (23) to pivot out of the open position and into the second locking position, where they snap into the flat grooves (25). This mechanism makes it possible to adjust the transport star (1) for three different bottle diameters quickly and easily by manually displacing the slide (33) with the first stop (30).

The second stop (31), which is positioned outside of the drive shafts' (22) circular path (34), pivots all passing drive shafts (22) from any locking position back into the open position, but no more than 90 degrees clockwise. This second stop is located in the transitional area between the transport star (1) and the rotary table (not shown) to which the bottles (2) are transferred when they exit the transport star (1). The cam's (23) self-locking action is sufficient to ensure that the bottles (2) are securely gripped as they move between stops 30 and 31.

In the execution described above, the transport star (1) operates purely as a feeder star without any sorting capabilities. By making the stops (30 and 31) height-adjustable, e.g., with a compressed-air cylinder, it is also possible to selectively close or open specific clamps (17, 18) without impairing the transport star's (1) adjustability for different bottle diameters. The device can also include several stops, which are positioned at various points in the circular path and are used to open and/or close the clamps (17, 18), so that the bottles (2) can be distributed onto several different conveyor belts, for example.

Figure 4:
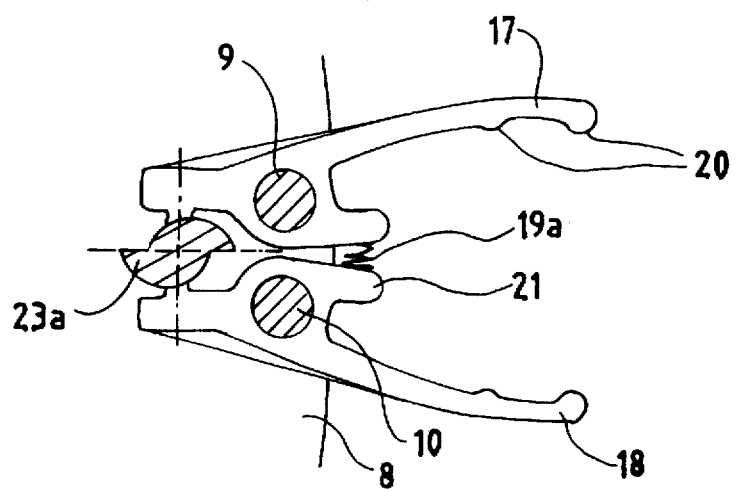
FIG. 4 is an enlarged top view of an alternate embodiment of a set of gripping pliers of the present invention.

In the execution shown in FIG. 4, the cam (23a) consists of two spiral segments which are positioned at 180 degree angles to one another. The opposing surfaces of the clamps' (17, 18) counter-arms are rounded accordingly. In this example, the cams (23a) become frictionally engaged instead of interlocking. This makes it possible to adjust the device gradually so that it can accommodate a specific range of bottle diameters. Therefore, it makes sense to position a stop (30) that is variably adjustable—with a screw rod, for example—on the feed conveyor belt (3). The second stop's (31) rigid placement remains unchanged.

The locking position for a large-diameter bottle is shown in FIG. 4. The clamps (17, 18) begin to close if the cam (23a) is pivoted further in a counter-clockwise direction. If the cam is pivoted in a clockwise direction, the clamps (17, 18) are opened.

Figure 5:
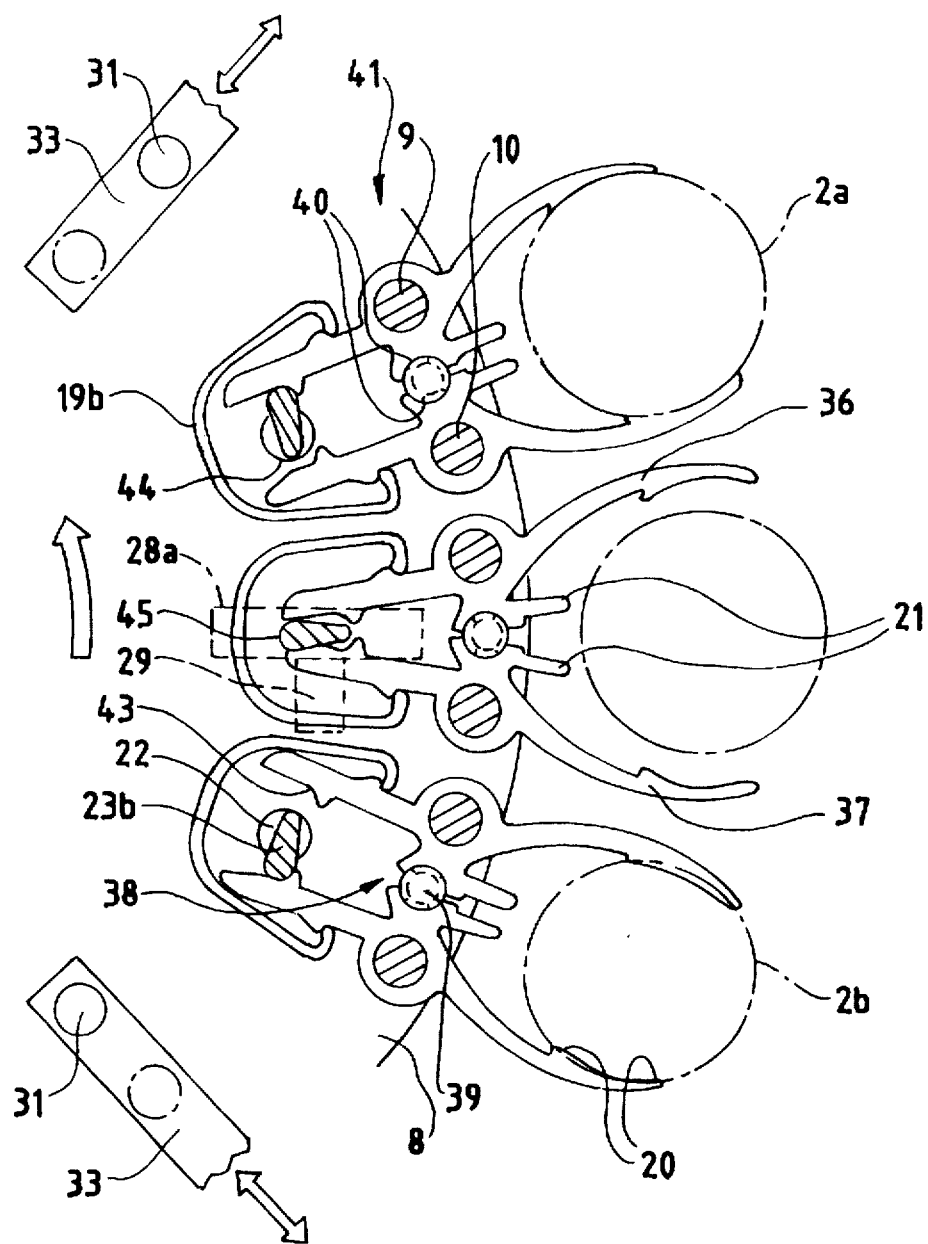
FIG. 5 is a partial top view of an alternate embodiment of the transport star of the present invention.

The transport star (41) shown in FIG. 5 corresponds in part to the transport star (1) shown in FIGS. 1 and 2. Therefore, the following text will only cover the differences between the two executions. The paired clamps (36, 37) which form the gripping pliers are made of an elastic plastic material, pivot on the bolts (9, 10) and are connected to one another with a toothed gear (38). The gear (38) has a vertical pin (39), which locks into semi-circular grooves (40) in the clamps (36, 37) without any play. A circular groove is cut into the pin (39) near its middle; the corresponding projections of the grooves (40) engage into this groove, which results in the pin (39) being positioned at a certain height. The pin (39) is located about halfway between the bolts (9, 10) and extends along the entire height of the clamps (36, 37). The pin (39) creates a revolving joint connection with reversed direction of rotation between the two clamps (36, 37), so that only one of the two clamps (36, 37) has to be directly controlled.

This one-sided control of each pair of gripping pliers is achieved with a pivotable cam (23b), which has only one rounded pressure zone (45) in a position that is eccentric to the cam's axis of rotation. There is a holding notch (43, 44) on each of the clamps' (36, 37) two counter-arms. These holding notches (43, 44) are of varying "depth" and act selectively in conjunction with the cam (23b). A projection is molded into the outside surface of each of the counter-arms. These projections act as retainers for a spring element (19b), which is a U-shaped molded plastic part. When this spring element (19b) is prestressed and placed onto the pairs of counter-arms, it presses them together, which opens the gripping pliers.

Once again, two control levers are attached to the bottom of each drive shaft (22). One control lever (28a) runs approximately parallel to the cam's (23b) cross-sectional longitudinal axis; one end of the control lever (28a) is elongated, so that it forms a T-shaped unit with the second control lever (29) positioned at a right angle to it. Two stationary stops (30, 31), both of which can be radially adjusted with slides (33) in relation to the transport star's (41) axis of rotation, act in conjunction with the control levers (28a, 29). The stops (30, 31) are located either to the left or the right of the drive shafts' (22) circular path; their positions are defined by holding notches.

If the two stops (30, 31) are in the positions shown in FIG. 5, then their action is similar to that of the stops (30, 31) shown in FIG. 1. This means that the first stop (30) pivots the drive shafts (22) of the cams (23b), which are moving in the direction of the arrow, approximately 90 degrees clockwise from their open position into their first locking position (lower gripping pliers in FIG. 5). When this occurs, the pressure zone (45) of the corresponding cam (23b) presses against the holding notch (44), which forces the clamp's (37) counter-arm into the gripping or locking position. The gear (38) transfers this pivoting movement in the opposite direction onto the other clamp (36). When this occurs, a small-diameter bottle (2b) is gripped and elastically wedged between the two clamps (36, 37) when they bend open slightly. The holding notch (44) is slightly displaced counterclockwise to dead center, so that the cam (23b) can be stabilized and brought into a locked position through the combined force of the spring element (19b) and the force created when the clamps (36, 37) are bent open elastically. The drive shafts (22) are rotated clockwise by 90 degrees when they pass the second stop (31); as a result, the cams (23b) are pivoted into their open position and the clamps (36, 37) are opened by the spring element (19b).

If the stops (30, 31) are in the positions indicated by the dotted line, then the passing drive shafts (22) will pivot in exactly the opposite direction. This means that the cams (23b) are pivoted clockwise from their open position into their second locking position (upper gripping pliers shown in FIG. 5). When this occurs, the pressure zone (45) presses against the holding notch (43), which forces the clamp's (36) counter-arm into the locking position, so that a large-diameter bottle (2a) is gripped and wedged into place. The holding notch (43) is also located slightly off-center, so that the cam (23b) can be brought into a locked position.

Adjusting the transport star (41) to accommodate either of the two bottles types is just as straightforward as it is to adjust the transport star (1) shown in FIGS. 1 and 2; an adjustment simply involves moving the two slides (33) to the corresponding opposite positions. This adjustment can also be made automatically with compressed air cylinders or similar devices. Locating the holding notches (43, 44) for different bottle types on different clamps (36, 37) ensures proper placement of bottles, as well as reducing wear-and-tear to the holding notches (43, 44).

Figure 6:
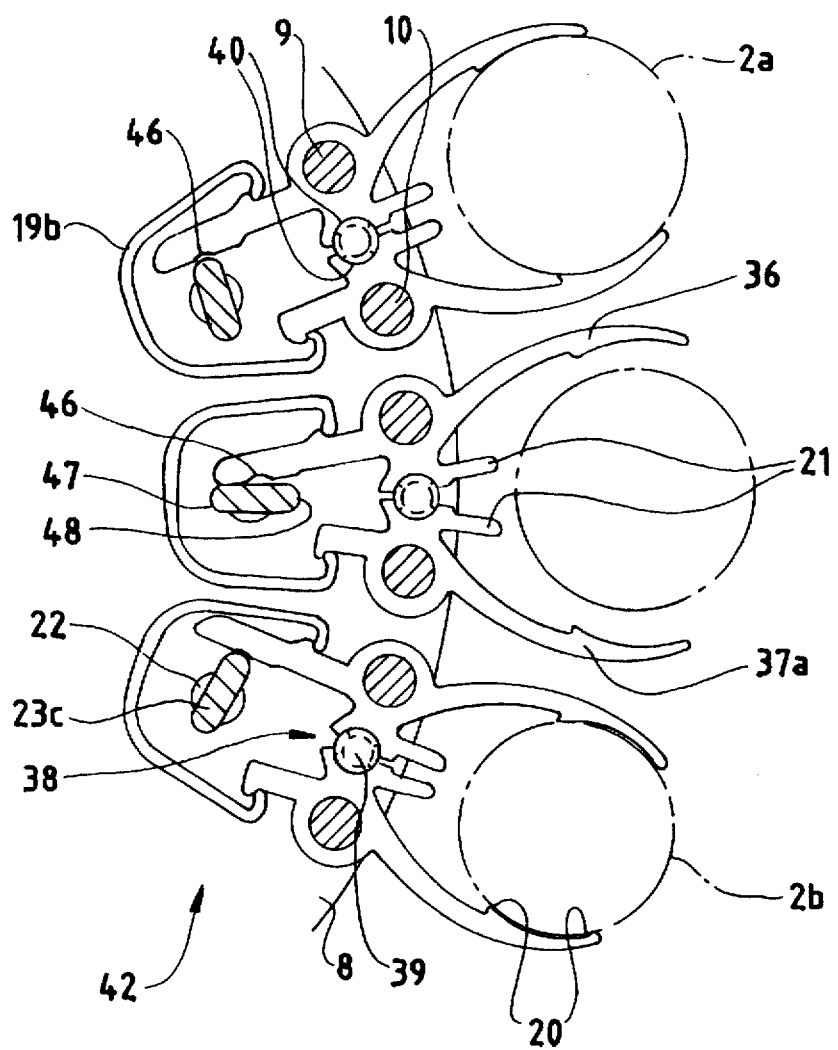
FIG. 6 is a partial top view of another alternate embodiment of the transport star of the present invention.

As the transport star (42) shown in FIG. 6 corresponds in part to the transport star (41) shown in FIG. 5, the following text will only cover the differences between the two executions. In this execution, the counter-arm for clamp 36 only has one holding notch (46), while the counter-arm for the other clamp (37a) is shortened to the extent that it no longer protrudes into the cam (23c) area, and only serves as a skewback for the spring element (19b). Therefore, one-sided control of the gripping pliers is achieved exclusively with the counter-arm to clamp 36. To this end, the cam (23c) has two pressure zones (47, 48), which are positioned at 180° to one another and are at different distances from the drive shaft's (22) axis of rotation. The cams (23c) are pivoted in the same way as the cams (23b) in the transport star (41) shown in FIG. 5, i.e., through stationary stops (30, 31, not depicted) and control levers (28a, 29) attached to the drive shafts (22).

If the cam (23c) is pivoted clockwise by approximately 90 degrees from its open position (gripping pliers at center in FIG. 6) into its first locking position, the "short" pressure zone (47) contacts the clamp (36) and presses its counter-arm into the locking position for a large-diameter bottle (2a) (gripping pliers shown at top in FIG. 6). If the cam (23c) is pivoted counter-clockwise by approx. 90 degrees from its open position into its second locking position, the "long" pressure zone (48) contacts the counter-arm of the clamp (36) into the locking position for a small-diameter bottle (2a) (gripping pliers shown at bottom in FIG. 6). In both locking positions, the holding notch (46) helps to stabilize the cam (23c).

In the transport stars described above, each pair of gripping pliers consists of two flexible clamps which, together, are controlled by an expander. Alternatively, it is possible to assign a separate expander to each clamp, so that the clamps can be controlled individually. Another option is to design the device in such a way that only one of the clamps is controlled, while the other clamp remains uncontrolled or rigid. Yet another option is to remove the gripping pliers and drive shafts from the basic structure entirely and place them in a separate auxiliary carrier, which has its own controls but pivots on bearings in the basic structure. This would make it possible to vary the spacing between containers and to change transport speed, both within preset limits. The expanders could also be equipped with more than two pressure zones for more than two locking positions. None of these optional features changes the basic parameters of the invention, just as the invention would not be essentially altered by attaching rotating rollers to the expanders or the clamps in order to reduce friction when the gripping pliers are opened and closed.

I claim:

1. A transport star for containers, consisting of a rotating basic structure having a feed-in area and an exit area and a plurality of gripping pliers with pivoting clamps positioned around the perimeter of the structure, each of said gripping pliers comprising a pair of double levers with gripping arms facing outward radially and a pair of counter-arms facing inward radially, and being engaged by a control apparatus consisting of a plurality of expanders, said expanders running on a plurality of flexible bearings and biasing the counter-arms into locking positions, each of said expanders having at least three different self-locking positions that alter the spacing between the gripping arms.

2. The transport star of claim 1, wherein said different locking positions for each of said expanders are defined at preset intervals by a plurality of holding notches located on said counter-arms.

3. The transport star of claim 1, wherein said different locking positions for each of said expanders are defined gradually by self-locking curved surfaces on said expanders.

4. The transport star of claim 1, 2, or 3, wherein said clamps are made of an elastic material, and said self-locking of each of the expanders is facilitated by elastic strain which develops in said clamps when a container is gripped by said clamps.

5. The transport star of claim 1, 2, or 3, wherein a spring element disposed between paired said clamps biases said counter-arms together.

6. The transport star of claim 1, wherein said control apparatus in the transport star feed-in area has an adjustable stationary stop, which transfers said expanders from an open position into a selected locking position.

7. The transport star of claim 1, wherein said control apparatus in the transport star exit area has an adjustable stationary stop, which transfers said expanders from a locking position into an open position.

8. The transport star of claim 1, 2, or 3, wherein said expanders consist of a plurality of cams running along a plurality of pivotable bearings, said expanders adjoining said counter-arms of clamps and being operable between said locking positions, wherein said expanders bias said counter-arms apart to varying degrees, and an open position.

9. The transport star of claim 8, wherein said cams are oval-shaped and said clamps' counter-arms are equipped with a plurality of grooves of varying depth, said cams being retained in said grooves.

10. The transport star of claim 9, wherein said grooves are close to one another and are separated by rounded transitional areas.

11. The transport star of claim 8, wherein each of said cams (23a) has two identical spiral segments positioned at 180 degrees to one another.

12. The transport star of claim 8, wherein each of said cams is connected by torsional strength with at least one control lever, which operates in conjunction with at least one stationary stop.

13. The transport star of claim 12, wherein an adjustable stop can be positioned at various distances from said transport star's axis of rotation, facilitating rotational motion of said cams around varying pivoting angles when said cams pass said adjustable stop, whereby a specific locking position is assigned to each pivoting angle.

14. The transport star of claim 12, wherein an adjustable stop can be positioned at various distances from the axis of rotation of said transport star, facilitating rotational motion of said cams in different directions of rotation when they pass said adjustable stop, whereby a specific locking position is assigned to each direction of rotation.

15. The transport star of claim 8, wherein said various locking positions and said open position of said cams lie within a 90 degree pivoting angle.

16. The transport star of claim 1, wherein said two clamps which form a set of said gripping pliers are connected to one another through torsional strength and in different rotational directions by a gear.

17. The transport star of claim 16, wherein said gear has a pin which loosely engages a set of grooves in both of said clamps.

18. The transport star of claim 16, wherein said expander only engages one of said two clamps of a set of said gripping pliers when said expander is in one of the locking positions.

19. The transport star of claim 16, wherein said cam only has one pressure zone, which is positioned eccentric to the axis of rotation of said cam, said counter-arms for the two said corresponding clamps have holding notches of varying shapes, and said cam can be switched between said two clamps.

20. The transport star of claim 16, wherein said cam has a plurality of pressure zones, which are positioned eccentric to and at various distances from said axis of rotation of said cam, and selectively engaging the counter-arm of one of said clamps.

21. The transport star of claim 16, wherein said gear is toothed.

22. The transport star of claim 1, wherein the different locking positions for each of said expanders are defined at preset intervals by a plurality of holding notches located on said expander.

23. The transport star of claim 1, wherein said different locking positions for each of said expanders (23a) are defined gradually by self-locking curved surfaces on said counter-arms.

24. The transport star of claim 1, wherein said expanders' various locking positions can be targeted selectively with said control apparatus.

* * * * *